United States Patent [19]

Matsumoto

[11] Patent Number: 5,012,579

[45] Date of Patent: May 7, 1991

[54] CUTTING MACHINE FOR SYNTHETIC RESIN PIPES

[75] Inventor: Misao Matsumoto, Okayama, Japan

[73] Assignee: Hiroshi Karaki, Kobe, Japan

[21] Appl. No.: 409,353

[22] Filed: Sep. 19, 1989

[30] Foreign Application Priority Data

Sep. 20, 1988 [JP] Japan .......................... 63-123868[U]
Dec. 7, 1988 [JP] Japan .......................... 63-159945[U]

[51] Int. Cl.[5] .............................................. B23D 21/06
[52] U.S. Cl. .......................................... 30/92; 30/243; 30/272.1
[58] Field of Search ......... 30/92, 282, 272.1, 241-243, 30/185, 278, 289

[56] References Cited

U.S. PATENT DOCUMENTS

| | | | |
|---|---|---|---|
| 86,138 | 1/1869 | Copeland | 30/92 X |
| 2,184,332 | 12/1939 | Berhay | 30/243 |
| 4,608,754 | 9/1986 | Kloster | 30/92 |

*Primary Examiner*—Douglas D. Watts
*Attorney, Agent, or Firm*—Armstrong, Nikaido, Marmelstein, Kubovcik, & Murray

[57] ABSTRACT

A cutting machine includes a machine body for holding a synthetic resin pipe subjected to cut work, a plate-like cutter provided on the machine body for advancing and retracting movement with respect to the pipe within a plane perpendicularly intersecting the center line of the pipe, and a drive means for the cutter provided on the machine body, the cutter being provided at its edge opposite to the pipe with an angled cutting blade having a width in a direction perpendicular to the advancing and retracting direction of the cutter larger than the outside diameter of the pipe, the blade portion displaced toward one side of an imaginary straight line which passes through a center of the pipe in parallel with the advancing and retracting direction of the cutter, a first inclined portion continuous to the edge portion and crossing the imaginary straight line, and a second inclined portion continuous to the edge portion on the side opposite to the first inclined portion and coming into contact with the inner peripheral surface of the pipe when the bight portion bites the inner peripheral surface in an intermediate process of the cutting work.

7 Claims, 6 Drawing Sheets

CUTTING MACHINE FOR SYNTHETIC RESIN PIPES

BACKGROUND OF THE INVENTION

1. Field of the Invention

The present invention relates to a cutting machine for synthetic resin pipes, and more particularly to a handy cutting type of machine.

2. Description of the Prior Art

As a cutting machine of this kind, the present inventor has previously developed a cutting machine comprising a machine body for holding a synthetic resin pipe subjected to cut work, a plate-like cutter provided on the machine body for advancing and retracting movement with respect to the pipe within a plane perpendicularly intersecting the center line of the pipe, and a drive means for the cutter provided on the machine body, the cutter being provided at an edge opposite to the pipe with an angled cutting blade having a width in a direction perpendicular to the advancing and retracting direction of the cutter larger than the outer diameter of the pipe, the angled cutting blade being composed of a bight portion passing through the center of the pipe and being positioned on an imaginary straight line parallel with the advancing and retracting direction of the cutter, and first and second inclined portions continuous to the bight portion and symmetrical with respect to said imaginary straight line.

It has been found however that the aforementioned cutting machine still need be improved as follows:

That is, when the cutting work starts, the bight portion of the cutting blade presses the peripheral wall of the pipe toward of the center thereof, and therefore, in the case where the pipe has a large diameter and a thin wall thickness, deformation, breakage or the like of the pipe may occur.

In addition, after the cutting work has been started, the peripheral wall of the pipe is cut by the first and second inclined portions. However, when the bight portion bites or stings the inner peripheral surface of the pipe in an intermediate process of the operation, the cutting by the bight portion and the cutting by both the inclined portions are simultaneously carried out, and cut portions in the pipe increase to three which had been previously two and therefore, a great force is required to move the cutter forward, and the rigidity of the cutting machine need be enhanced accordingly.

SUMMARY OF THE INVENTION

It is therefore an object of the present invention to provide a cutting machine of the type described above, which is simple in construction, capable of efficiently performing cutting work without causing a synthetic resin pipe to be deformed or the like.

For achieving the aforesaid object, according to the present invention, there is provided a cutting machine for a synthetic resin pipe comprising a machine body for holding a synthetic resin pipe subjected to cut work, a plate-like cutter provided on the machine body for advancing and retracting movement with respect to the pipe within a plane perpendicularly intersecting a center line of the pipe, and a drive device for the cutter provided on the machine body, the cutter being provided at an edge thereof opposite to the pipe with an angled cutting blade having a width in a direction perpendicular to the advancing and retracting direction of the cutter larger than an outside diameter of the pipe, the angled cutting blade being comprised of a bight portion displaced toward one side of an imaginary straight line which passes through a center of the pipe in parallel with the advancing and retracting direction of the cutter, a first inclined portion continuous to the bight portion and intersecting the imaginary straight line, and a second inclined portion continuous to the bight portion on the to the opposite said first inclined portion and coming into contact with the inner peripheral surface of the pipe when the bight portion bites the inner peripheral surface in an intermediate process of the cutting work.

With the aforesaid arrangement, the bight portion of the cutter is formed substantially into a point, and therefore, can positively bite the outer surface of the peripheral wall of the pipe when the pipe cutting work starts. In this case, since the bight portion is deviated from the aforementioned imaginary straight line, the peripheral wall of the pipe is not pressed toward of the center thereof, thereby preventing the pipe from being deformed and broken.

Then, the cutting of the peripheral wall of the pipe is accomplished by both the inclined portions. When the bight portion bites the inner peripheral surface of the pipe in an intermediate process, the second inclined portion comes into contact with the aforesaid inner peripheral surface, and therefore, cutting portions are still maintained at two. Thereby, the force required to move the cutter forward is suppressed from variation.

Thereafter, when the bight portion and the second inclined portion protrude outwardly of the peripheral wall of the pipe, the cutting by the first inclined portion is accomplished.

Accordingly, according to the present invention, there is provided a cutting machine, which is simple in construction, capable of efficiently cutting a synthetic resin pipe without occurrence of deformation or the like.

The above and other objects, features and advantages of the present invention will become apparent from the description of the preferred embodiments which will be described hereinafter in detail with reference to the accompanying drawings.

DESCRIPTION OF THE PREFERRED EMBODIMENTS

Figure 1:
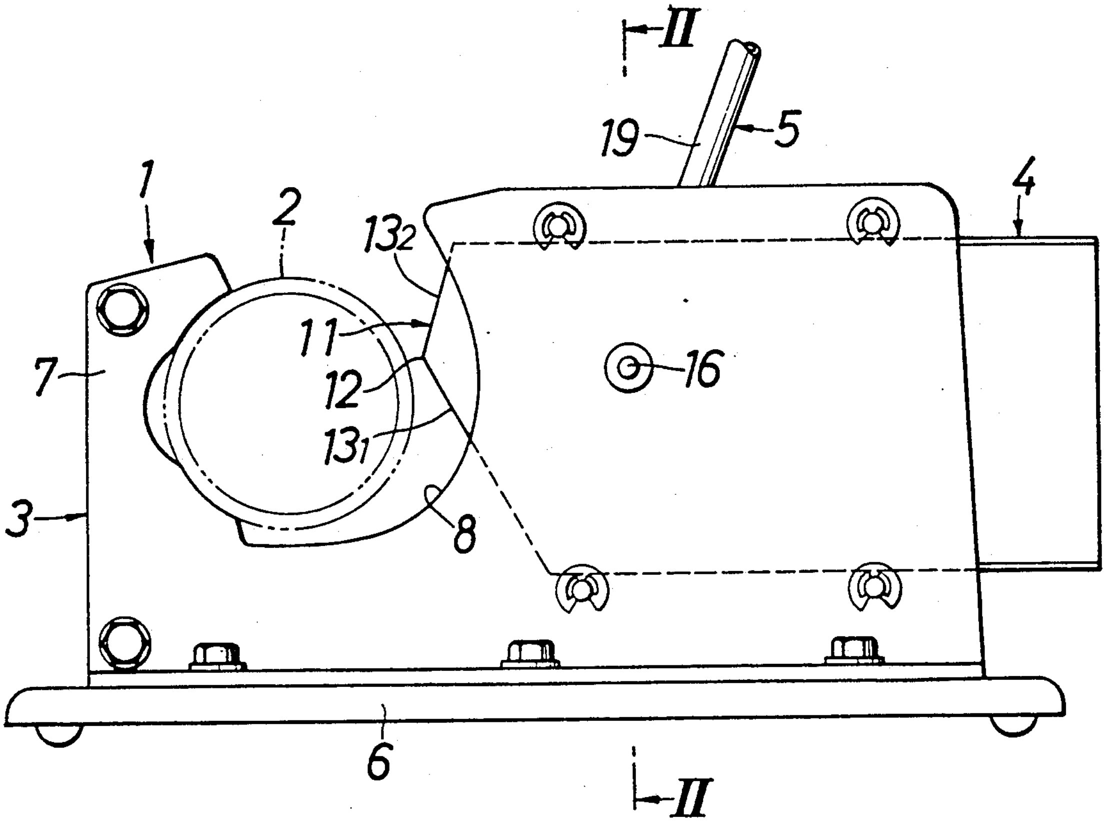
FIGS. 1 to 4 show a first embodiment, FIG. 1 being a front view, FIG. 2 sectional view taken on line II—II of FIG. 1, FIG. 3 a sectional view taken on line III—III of FIG. 2, and FIG. 4 an explanatory view for the cutting operation.

FIGS. 1 to 4 show a first embodiment in which a cutter is movable in a horizontal direction.

A cutting machine 1 is provided with a machine body 3 for horizontally holding a synthetic resin pipe 2 subjected to cut work, a plate-like cutter 4 made from a steel plate which is provided on the machine body 3 and capable of horizontally advancing and retracting with respect to the pipe 2 within a plane perpendicular to the center line $L_1$—$L_1$ of the pipe 2, and a drive means 5 for the cutter provided on the machine body 3.

The machine body 3 comprises a bed or base 6 and a pair of side plates 7 stood upright on the bed 6 with and a predetermined spacing defined between both the side plates 7.

An upwardly opened and approximately recessed arc-like pipe-holding groove 8 is formed on one side of the side plates 7. In this case, the size of the pipe holding groove 8 is set so as to receive therein a pipe having the largest outside diameter (for example, outside diameter of 115 mm) among the pipes 2 to be cut. An upper edge portion and a lower edge portion of the cutter 4 are supported on a plurality of grooved wheels 10 mounted between both the side plates 7. These upper and lower edge portions are formed into a V-shape in section, which are in close contact with the outer peripheral surface of each of the grooved wheels 10, thereby obtaining the straight forward movement of the cutter 4.

The cutter 4 has an angled cutting blade 11 on the edge opposite the pipe 2, and a width d of the angled cutting blade 11 in a direction perpendicular to an advancing and retracting direction a of the cutter is set to be larger than an outside diameter D of the pipe 2 having the largest outside diameter.

The angled cutting blade 11 is composed of an a bight portion 12 located on one side of an imaginary straight line $L_2$—$L_2$ passing through a center O of the pipe 2 and parallel with the advancing and retracting direction a of the cutter, that is, displaced upwardly in the illustrated embodiment, a first inclined portion $13_1$ continuous to the bight portion 12 and crossing the imaginary straight line L—$L_2$, and a second inclined portion $13_2$ continuous to the bight portion 12 on the side opposite the first inclined portion $13_1$ and coming into contact with the inner peripheral surface of the pipe 2 when the bight portion 12 engages the inner peripheral portion of the pipe 2 in an intermediate process of the cutting operation.

Inclined angles $\alpha$ and $\beta$ of the first and second inclined portions $13_1$ and $13_2$ with respect to a plane p perpendicular to the imaginary straight line $L_2$—$L_2$ and including the bight portion 12 are set so that the angle $\beta$ on the second inclined portion $13_2$ side is smaller than the angle $\alpha$ on the first inclined portion $13_1$ side. For example, one inclined angle $\alpha$ is approximately 40° while the other inclined angle $\beta$ is approximately 15°.

The cutter drive means 5 is constructed as follows:

In the central portion of the cutter 4 is formed a rectangular window 14 of which the long side is positioned in the advancing and retracting direction of the cutter. The lower edge of the window 14 is on the imaginary straight line $L_2$—$L_2$, and a rack 15 is formed on the lower edge. A pinion 16 is meshed with the rack 15, and a rotational shaft 17 supporting the pinion 16 is rotatably mounted over both the side plates 7. An operating lever 19 as an operating member is connected to one end of the rotational shaft 17 through a known reversible ratchet mechanism 18. The meshing relationship between the rack 15 and the pinion 16 is set so that when the cutter 4 is in its retracted position, one pinion 16 is in the vicinity of the end portion of the rack 15 on the side of the pipe holding groove 8.

With the above-described arrangement, when the cutting operation of the pipe 2 is started, the pipe is put in the pipe holding groove 8, and the cutter 4 at the retracted position is moved forward by the operating lever 19 through the rack 15 and the pinion 16.

Figure 4:
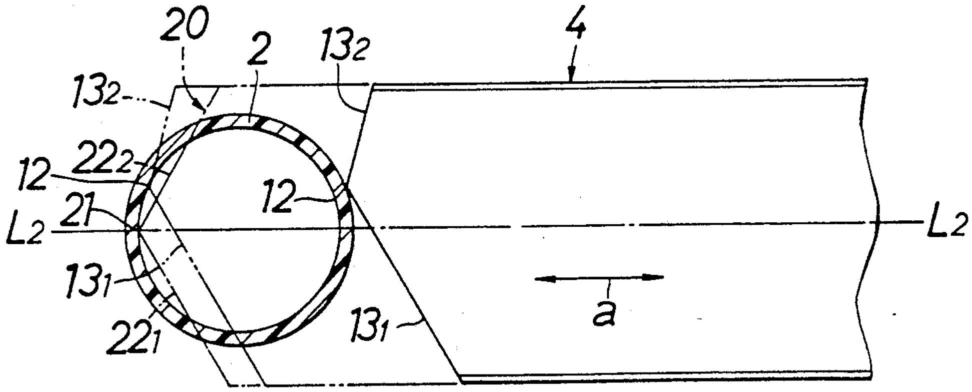

As indicated by the solid line of FIG. 4, since the bight portion 12 of the cutter 4 is formed substantially into a point, the bight portion 12 positively bites or stings the outer surface of the peripheral wall of the pipe 2 when the cutting operation of the pipe 2 starts. In this case, since the bight portion 12 is deviated upwardly from the imaginary straight line $L_2$—$L_2$, the peripheral wall of the pipe 2 is not pressed in the direction of the center thereof, thereby preventing the pipe 2 from being deformed or broken.

Then, the cutting of the peripheral wall of the pipe 2 is carried out by both the inclined portions $13_1$ and $13_2$ of the angle cutting edge 11. As indicated by the chain line of FIG. 4, when the bight portion 12 bites or stings the inner peripheral surface of the pipe 2 in the intermediate process of the operation, the second inclined portion $13_2$ comes into contact with the inner peripheral surface of the pipe 2, and therefore, cut portions are still maintained two.

Thereafter, when the bight portion 12 and the second inclined portion $13_2$ protrude outwardly of the peripheral wall of the pipe 2, the cutting by the first inclined portion $13_1$ is carried out.

A cutter 20 indicated by one dotted line in FIG. 4 is of a conventional example. It is understood that cutting is carried out at three portions, i.e., a ridge portion 21 and both inclined portions $22_1$ and $22_2$, in the intermediate process of the operation.

Figure 5:
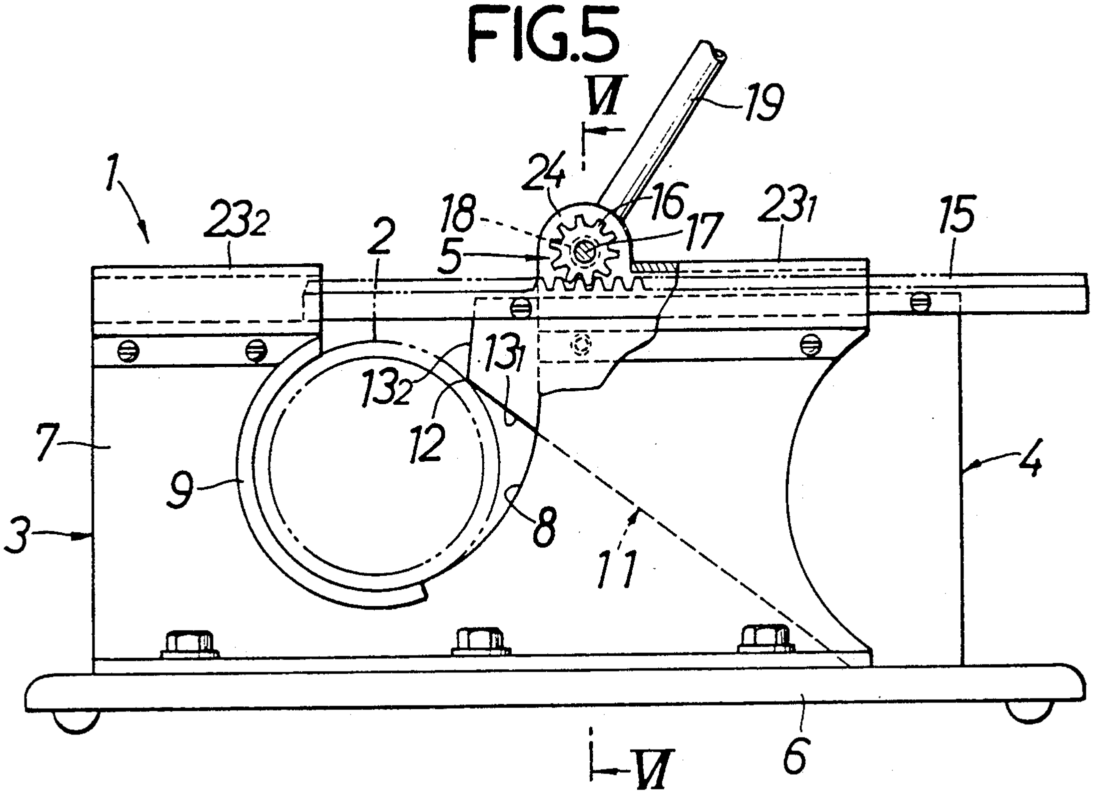
FIGS. 5 and 6 show a second, embodiment, FIG. 5 being a front view and FIG. 6 a sectional view taken on line VI—VI of FIG. 5.
Figure 6:
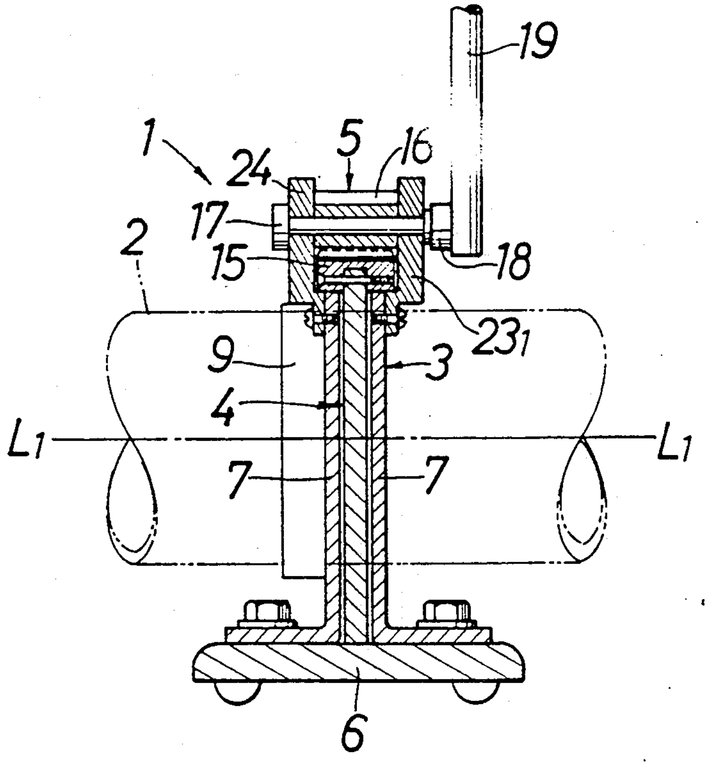

FIGS. 5 and 6 show a second embodiment. In this embodiment, the cutter 4 is advanced and retracted while being held by both the side plates 7. The rack 15 is mounted on the upper edge of the cutter 4 and is slidably moved within a pair of guide $23_1$ and $23_2$ carried on the upper edges of both the side plates 7. The rotational shaft 17 of the pinion 16 is rotatably supported on a bearing 24 integral with one guide $23_1$. On the outer surface of one side plate 7 is mounted a pipe receiver 9 so as to be along approximately half portion of the pipe holding groove 8. The angle of inclination $\beta$ of the second inclined portion $13_2$ is approximately zero, accordingly, close to a vertical.

Since other structures are substantially the same as those described in the above-described first embodiment, parts in the second embodiment corresponding to those of the first embodiment are indicated by the same reference numerals, and the detailed description thereof is omitted.

Figure 2:
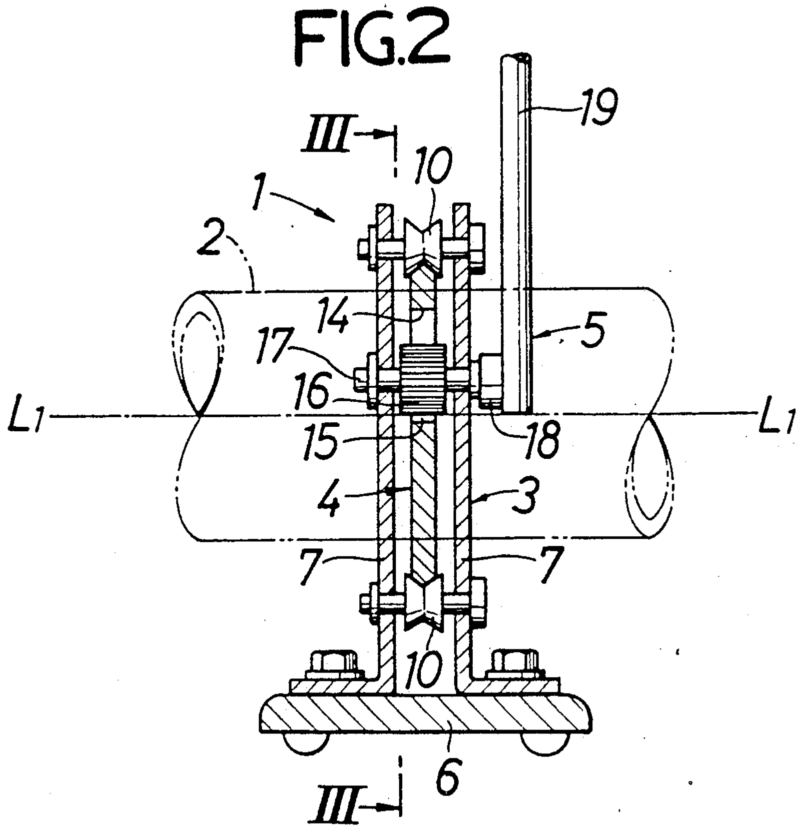
Figure 3:
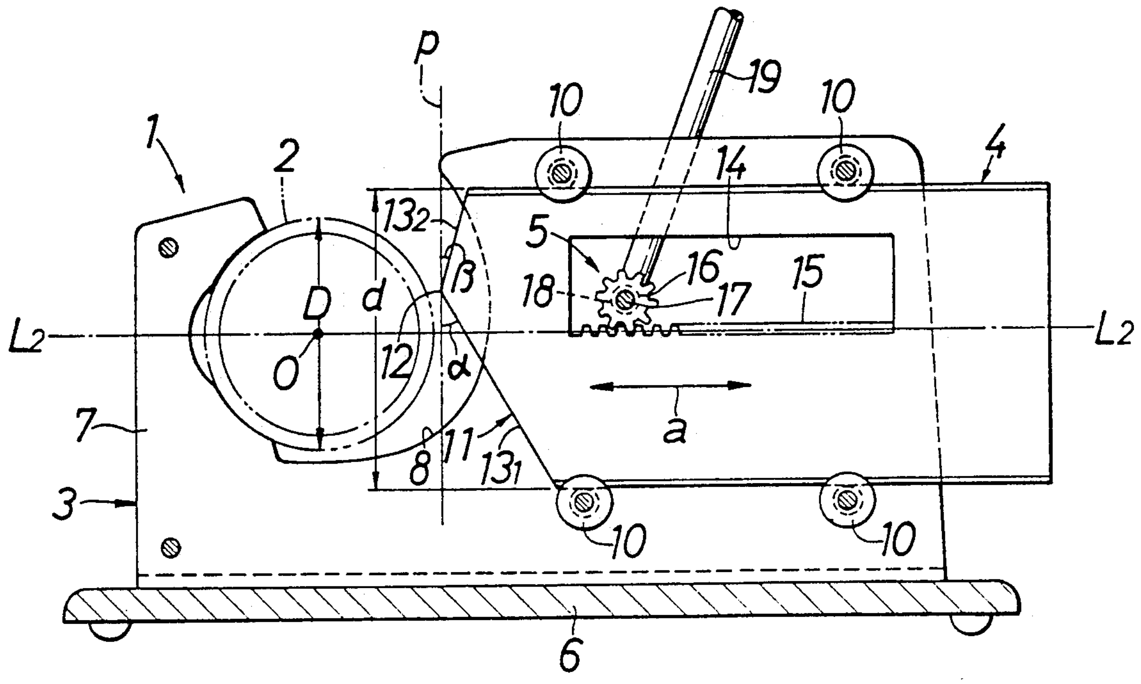
Figure 7:
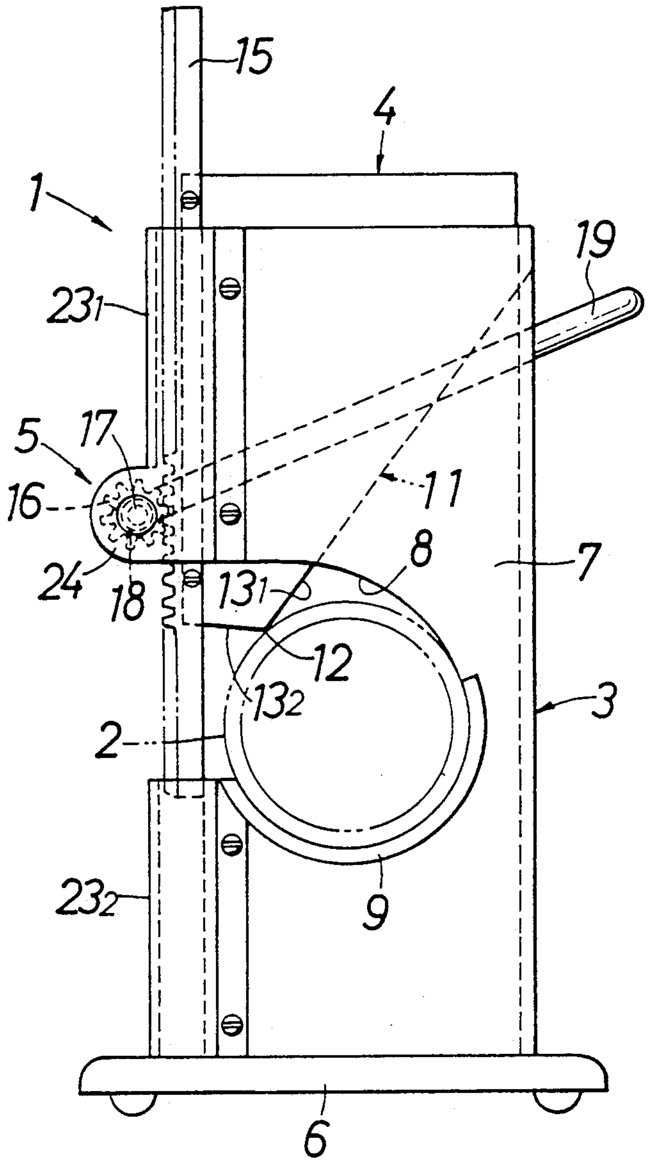
FIG. 7 is a front view of a third embodiment.

FIG. 7 shows a third embodiment, in which the lateral type cutting machine shown in FIG. 2 is changed into a longitudinal type. Parts in the third embodiment corresponding to those shown in the second embodiment are indicated by the same reference numerals.

Figure 8:
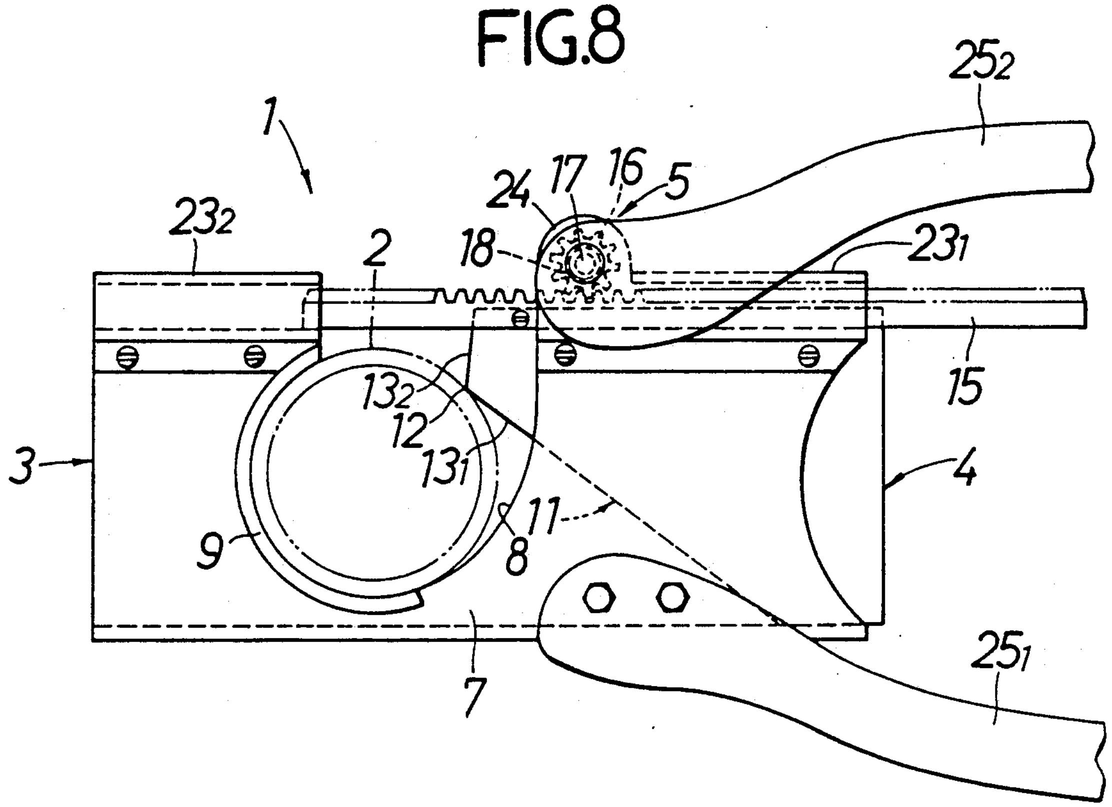
FIG. 8 is a front view of a fourth embodiment.

FIG. 8 shows a fourth embodiment, in which the operating member is comprised of a pair of first and second handles $25_1$ and $25_2$ held by the operator's hand, in place of the operating lever 19 in the second embodiment. One end of the first handle $25_1$ is secuted to the side plates 7, and one end of the second handle $25_2$ is connected to the rotational shaft 17 of the pinion 16 through the reversible ratchet mechanism 18. Although not shown, a return spring is provided between both the handles $25_1$ and $25_2$.

With this arrangement, the cutting operation can be carried out for the pipe 2 irrespective of the posture of the cutting machine 1.

FIGS. 9 to 12 show modified examples of the cutter 4. These cutters 4 are used properly according to the purpose intended.

Figure 9:
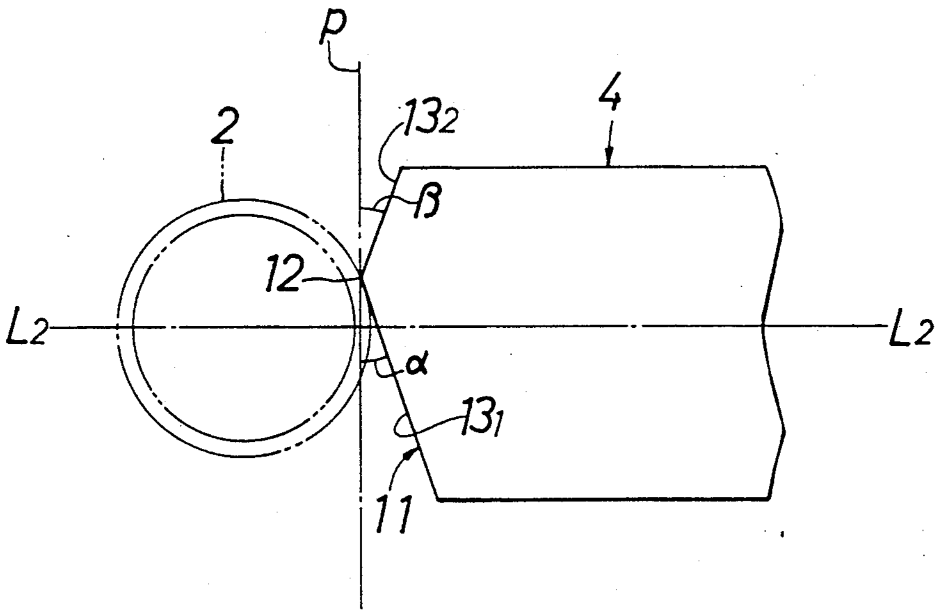
FIGS. 9 to 12 are respectively front views of four kinds of cutters.

In the FIG. 9 embodiment, the angles of inclination $\alpha$ and $\beta$ of the inclined portions $13_1$ and $13_2$ are set to be equal to each other.

Figure 10:
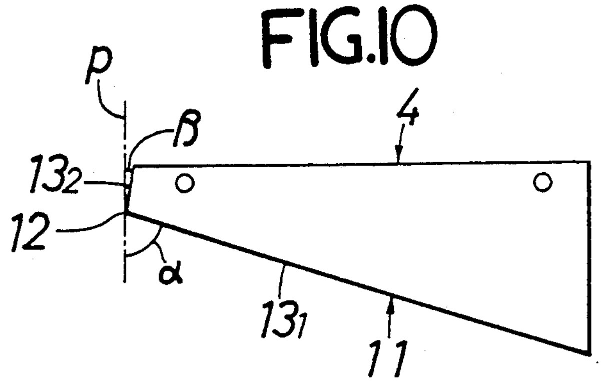

In the FIG. 10 embodiment, the length of the first inclined portion $13_1$ is set to be long and the angle of inclination $\alpha$ set to be gentle, whereas the length of the second inclined portion $13_2$ is set to be short and the angle of inclination 62 set to be approximately zero.

Figure 11:
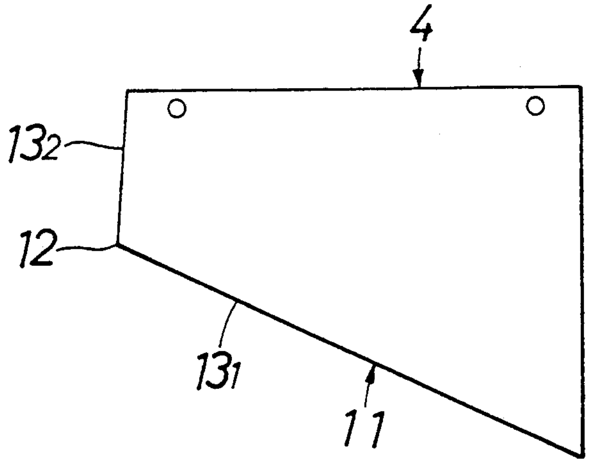

In the FIG. 11 embodiment, the length of the second inclined portion $13_2$ in the FIG. 10 embodiment is set to be long.

Figure 12:
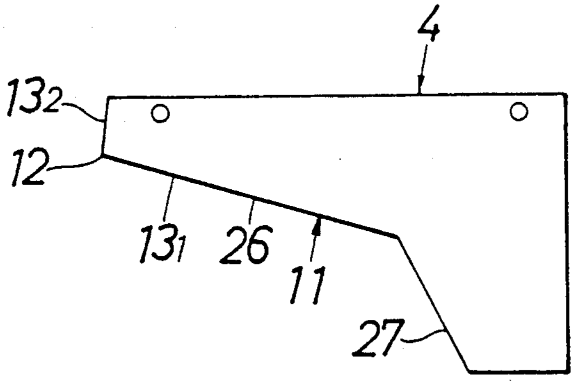

In the FIG. 12 embodiment, the first inclined portion $13_1$ is composed of a gentle incline area 26 continuous to the bight portion 12 and a sharp inclined area 27 continuous to the gentle inclined area 26. The cutting speed at the sharp inclined area 27 is made to be higher than that of the gentle inclined area 26.

What is claimed is:

1. A cutting machine for a synthetic resin pipe comprising:

a machine body for holding a synthetic resin pipe subjected to cut work;

a plate-like cutter provided on the machine body for advancing and retracting movement with respect to the pipe within a plane perpendicular to a center line of the pipe, the cutter being provided at an edge opposite to the pipe with an angled cutting blade having a width in a direction perpendicular to the advancing and retracting direction of the cutter larger than an outside diameter of the pipe, said angled cutting blade being comprised of first and second inclined portions intersecting at a bight portion located on one side of an imaginary straight line passing through a center of the pipe and parallel with the advancing and retracting direction of the cutter, said first inclined portion being continuous to said bight portion and intersecting said imaginary straight line, and said second inclined portion being continuous to said bight portion on the side of said imaginary straight line opposite said first inclined portion and coming into contact with the inner peripheral surface of the pipe when said bight portion bites said inner peripheral surface in an intermediate process of the cutting work; and a driving means for the cutter provided on the machine body.

2. The cutting machine according to claim 1, wherein angles of inclination of said first and second inclined portions with respect to a plane perpendicular to said imaginary straight line and including said bight portion are set to be equal to each other.

3. The cutting machine according to claim 1, wherein angles of inclination of said first and second inclined portions with respect to a plane perpendicular to said imaginary straight line and including said bight portion are set so that the angle of inclination of said second inclined portion is less than the angle of inclination of said first inclined portion.

4. The cutting machine according to claim 3, wherein said first inclined portion comprises a gentle inclined area continuous to said bight portion, and a sharp inclined area continuous to said gentle inclined area.

5. The cutting machine according to claim 1, 2, 3 or 4, wherein said drive means for the cutter comprises a rack provided on the cutter, a pinion supported on said machine body through a rotational shaft and meshed with said rack, and an operating member connected to said rotational shaft.

6. The cutting machine according to claim 5, wherein said operating member comprises a lever connected to said rotational shaft through a reversible ratchet mechanism.

7. The cutting machine according to claim 5, wherein said operating member comprises a pair of first and second handles held by an operator's hand, said first handle having one end secured to said machine body, said second handle having one end connected to said rotational shaft through the reversible ratchet mechanism.

* * * * *